(12) United States Patent
Ekambaram et al.

(10) Patent No.: US 9,978,396 B2
(45) Date of Patent: May 22, 2018

(54) GRAPHICAL DISPLAY OF PHONE CONVERSATIONS

(71) Applicant: International Business Machines Corporation, Armonk, NY (US)

(72) Inventors: Vijay Ekambaram, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/071,772

(22) Filed: Mar. 16, 2016

(65) Prior Publication Data

US 2017/0270951 A1    Sep. 21, 2017

(51) Int. Cl.
| | | |
|---|---|---|
| *G10L 21/06* | (2013.01) | |
| *G10L 25/00* | (2013.01) | |
| *G10L 25/63* | (2013.01) | |
| *G10L 21/10* | (2013.01) | |
| *G06F 3/01* | (2006.01) | |
| *G06F 3/0481* | (2013.01) | |
| *G06T 11/20* | (2006.01) | |

(52) U.S. Cl.
CPC .............. *G10L 25/63* (2013.01); *G10L 21/10* (2013.01); *G06F 3/017* (2013.01); *G06F 3/04817* (2013.01); *G06T 11/206* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 6,721,704 B1 | 4/2004 | Strubbe et al. | |
| 7,191,129 B2 * | 3/2007 | Brown | G10L 15/26 |
| | | | 379/202.01 |
| 8,407,048 B2 | 3/2013 | Rogers | |
| (Continued) | | | |

FOREIGN PATENT DOCUMENTS

| | | |
|---|---|---|
| EP | 2784774 A1 | 10/2014 |
| WO | 2012135783 A2 | 10/2012 |
| WO | 2012135783 A3 | 10/2012 |

OTHER PUBLICATIONS

Ezzat et al., "Sentiment Analysis of Call Centre Audio Conversations using Text Classification", International Journal of Computer Information Systems and Industrial Management Applications, ISSN 2150-7988, vol. 4, 2012, pp. 619-627, © MIR Labs, Dynamic Publishers, Inc., USA.

(Continued)

*Primary Examiner* — Kevin Ky
(74) *Attorney, Agent, or Firm* — Alexa L. Ashworth; A. Imtiaz Billah (57) ABSTRACT

Embodiments of the present invention provide systems and methods for analyzing mobile device usage. During the course of a conversation, a graphical display is generated on a mobile device which depicts entity nodes, conversation nodes, and a voice channel boundary. New nodes can be generated in response to the conversation nodes in order to reduce the tension of the conversation, reduce topic diversion, respond to received user gesture, and answer queries. Furthermore, embodiments of this invention describe a color-coded graphical display which depicts emotional sentiments during a conversation.

9 Claims, 7 Drawing Sheets

(56) References Cited

U.S. PATENT DOCUMENTS

| | | |
|---|---|---|
| 8,612,211 B1 | 12/2013 | Shires et al. |
| 2013/0297317 A1 | 11/2013 | Lee et al. |
| 2014/0140497 A1* | 5/2014 | Ripa .................. H04M 3/5133 379/265.06 |
| 2014/0258817 A1 | 9/2014 | Carrier et al. |
| 2016/0125346 A1* | 5/2016 | Krantz ................. G06F 3/0484 705/7.41 |

OTHER PUBLICATIONS

Harris, "Baidu claims deep learning breakthrough with Deep Speech", Gigaom, Dec. 18, 2014, 6 pages, <https://gigaom.com/2014/12/18/baidu-claims-deep-learning-breakthrough-with-deep-speech/>.

Moubayed et al., "Audio-Visual Prosody: Perception, Detection, and Synthesis of Prominence", Proceedings of the Third Cost 2102 international training school conference on Toward autonomous, adaptive, and context-aware multimodal interfaces: theoretical and practical issues, Mar. 15, 2010, pp. 55-71, Springer-Verlag Berlin, Heidelberg © 2011.

Schuller, "Voice and Speech Analysis in Search of States and Traits", Computer Analysis of Human Behavior, 2011, pp. 233-258.

Steyvers et al., "Probabilistic Topic Models", Handbook of Latent Semantic Analysis, vol. 427, Issue 7, Feb. 15, 2007, pp. 424-440.

"Method and system of publishing and sharing mood status for users of mobile phone", An IP.com Prior Art Database Technical Disclosure, IP.com No. 000210015, Aug. 22, 2011, pp. 1-4.

"Speech analyser monitors emotion for call centres", New Scientist, May 7, 2014, 4 pages, <https://www.newscientist.com/article/mg22229683.800-speech-analyser-monitors-emotion-for-call-centres/>.

U.S. Appl. No. 14/737,886, filed Jun. 12, 2015, Entitled "Transferring Information During a Call".

* cited by examiner

GRAPHICAL DISPLAY OF PHONE CONVERSATIONS

BACKGROUND OF THE INVENTION

The present invention relates generally to the field of telecommunications technology and more specifically to analyzing mobile phone device usage.

During a phone call, the participants may refer to many online websites and personal files to gather contents in order to speak continuously during the phone call. In an abstract sense, people are converting visual content to voice content instantaneously during phone call conversations. Voice mining technology may be applied to processing phone call conversations. Functionalities such as speech analysis and prosodical analysis (i.e., the elements of speech that are not individual phonetic segments, such as vowels and consonants, but are properties of syllables and larger units of speech) are used in voice mining technology. These functionalities are applied to call center software, heat map generation, understanding emotions, and the detection of eye blink and other human interactions/gestures.

SUMMARY

According to one embodiment of the present invention, a method for analyzing mobile device usage is provided with the method comprising the steps of: creating, by one or more processors, a graph display to depict a conversation between at least two parties; receiving, by one or more processors, voice data from a first party of the at least two parties and encoding the data into a node of the graph display associated with the first party; receiving, by one or more processors, a new node in the graph display; sending, by a user, the new node over a virtualized boundary in the graph display; and receiving, by at least one other user, content associated with the new node in the graph display.

Another embodiment of the present invention provides a computer program product for analyzing mobile device usage based on the method described above.

Another embodiment of the present invention provides a computer system for analyzing mobile device usage based on the method described above.

DETAILED DESCRIPTION

Mobile devices (i.e., mobile phones) can perform speech analysis, prosodical analysis, and emotional analysis. Changes in emotional sentiments can be indicated by the tone of voice of the participants (of the conversation). Furthermore, conversations can experience diversions or include further queries to keep the conversation continuous. The data deriving from the voices of people involved in a conversation can be analyzed and further manipulated to gain insights to emotional sentiments and search queries. The embodiments of the present invention creates visual displays (in order to map out conversations) based on emotional sentiments, search queries, divergent conversation paths, and user gestures.

Figure 1:
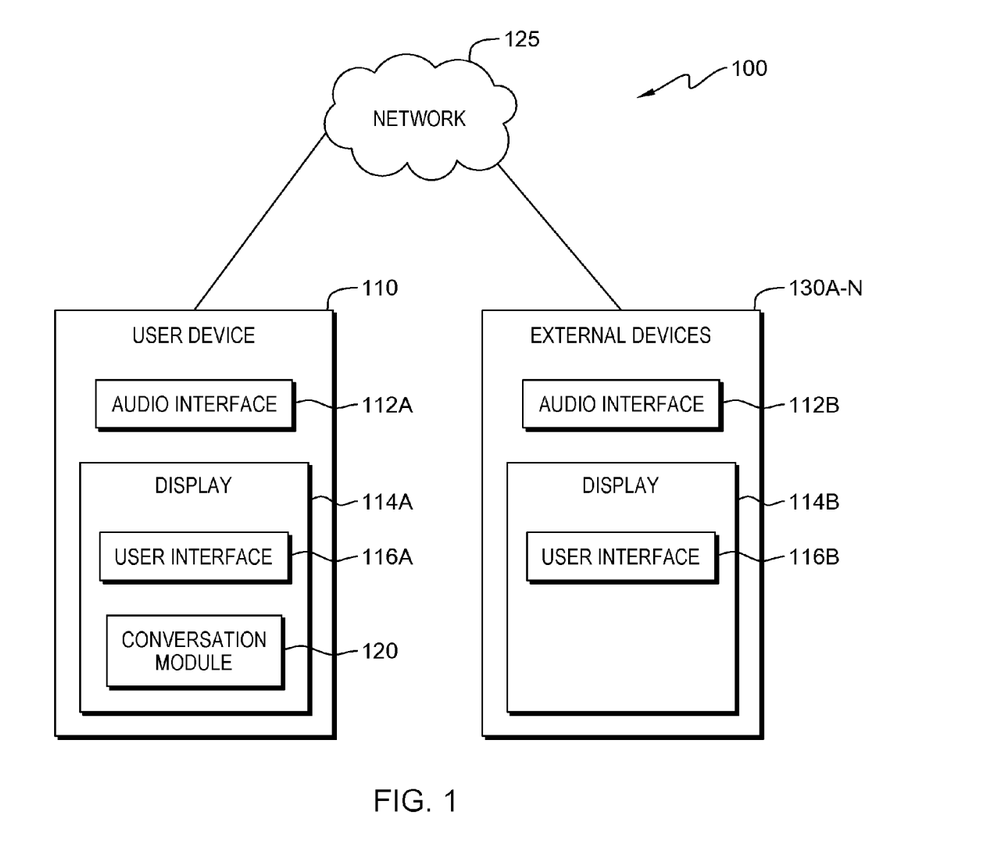
FIG. 1 is a functional block diagram illustrating a communication processing environment, in accordance with an embodiment of the present invention.

The present invention will now be described in detail with reference to the Figures. FIG. 1 is a functional block diagram illustrating a communication processing environment, generally designated 100, in accordance with one embodiment of the present invention. FIG. 1 provides only an illustration of implementation and does not imply any limitations with regard to the environments in which different embodiments may be implemented. Modifications to communication processing environment 100 may be made by those skilled in the art without departing from the scope of the invention as recited by the claims. In this exemplary embodiment, communication processing environment 100 includes user device 110 and external devices 130A-N, interconnected via network 125.

Network 125 may be a local area network (LAN), a wide area network (WAN) such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between user device 110 and external devices 130A-N, in accordance with embodiments of the invention. Network 125 may include wired, wireless, or fiber optic connections.

User device 110 and external devices 130A-N are mobile devices. In other embodiments, user device 110 and external devices 130A-N may be a laptop computer, a tablet computer, a thin client, or personal digital assistant (PDA). In general, user device 110 and external devices 130A-N may be any mobile electronic device or mobile computing system capable of sending and receiving data, and communicating with a receiving device over network 125. User device 110 and external devices 130A-N may include internal and external hardware components, as depicted and described in further detail with respect to FIG. 7. User device 110 contains audio interface 112A, display 114A, user interface 116A, and conversation module 120. External devices 130A-N contains audio interface 112B, display 114B, and user interface 116B.

In this exemplary embodiment, audio interfaces 112A and 112B include a recording component in order to record audio; a speaker component in order to output audio to a listener; and a microphone component in order to input audio to a listener. Audio interface contains an audio codec device (not pictured) which can code or decode a digital data stream of audio.

In this exemplary embodiment, display 114A and 114B may be composed of, for example, a liquid crystal display screen, an organic light emitting diode display screen, or other types of display screens. A user can use the touch screen of display 114A or 114B to manipulate content by moving or sharing content. Display 114A and 114B contain user interface (UI) 116A and 116B, respectively.

User interface 116A and 116B may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 116A and 116B is capable of receiving data, user commands, and data input modifications from a user. Based on content depicted in displays 114A and 114B, user interface 116A and 116B permit a user to observe content and manipulate content in conversation module 120.

Conversation module 120 is implemented when a phone call starts. Conversation module 120 generates an interaction graph display which automatically "pops-up" (i.e., appears) in display 114A. Additional functionalities of conversation module 120 include: (i) the identification of parties within a conversation; (ii) the creation of nodes within an interaction graph display; (iii) the determination of associations between parties within the conversation; (iv) the processing of received user gestures; (v) the analysis of the sentiment/emotion index of the conversation (i.e., the level of emotion of the conversation); (vi) the processing of common string queries; and (vii) the generation of metadata. The analysis of the sentiment/emotion index of the conversation generates a color-coded interaction graph display. The generation of metadata allows for further search queries. Metadata is data which describes other data which characterized as either structural metadata or descriptive metadata. Structural metadata is data about the containers of data while descriptive metadata uses individual instances of application data or the data content.

Figure 2:
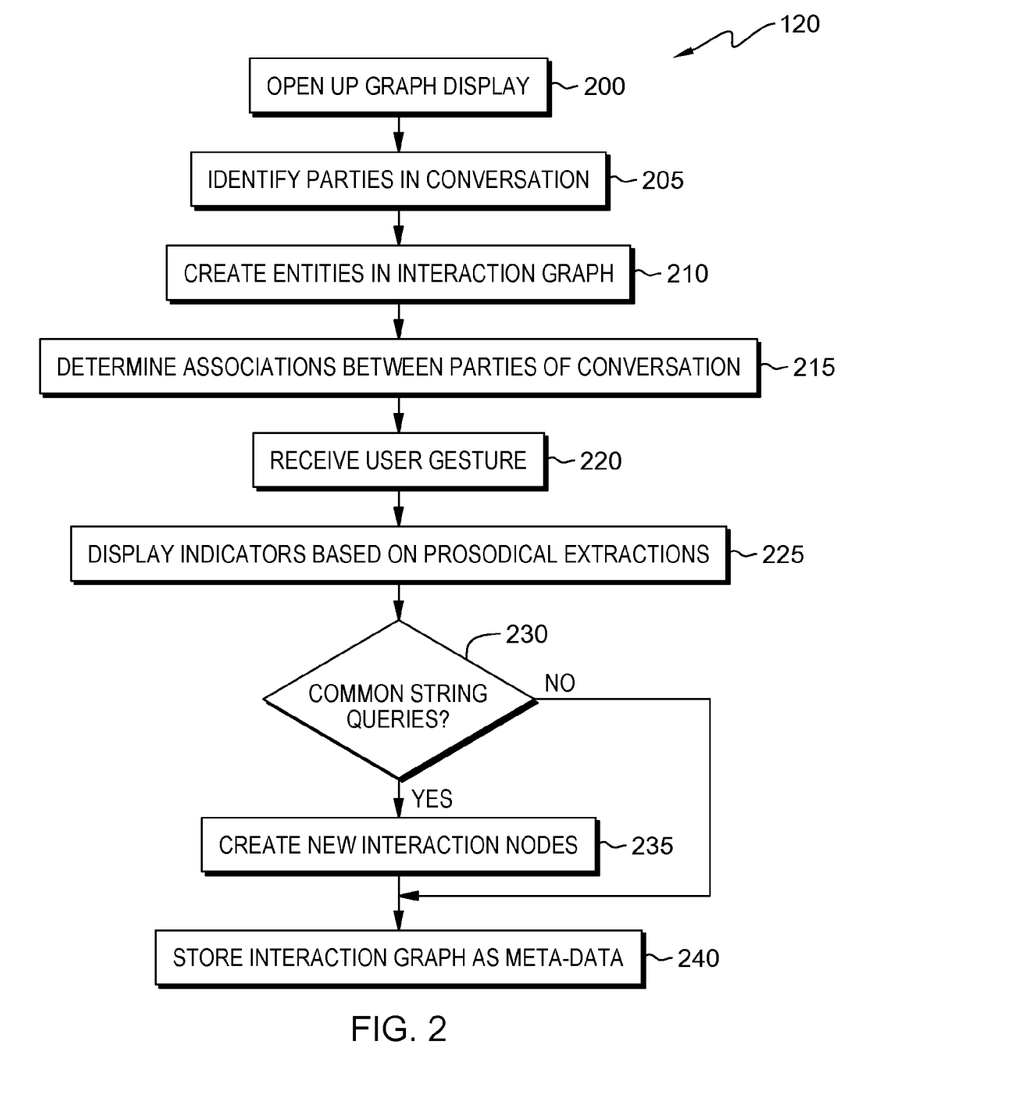
FIG. 2 is an flowchart depicting the steps implemented by conversation module 120, in accordance with an embodiment of the present invention.

FIG. 2 is a flowchart depicting the steps implemented by conversation module 120, in accordance with an embodiment of the present invention.

In step 200, conversation module 120 opens up a graph display. The graph is visible to the user. At this stage, at least two parties are communicating/conversing with each other via mobile devices or other devices with smart phone capability. In one embodiment, the conversation over the mobile devices triggers the initiation of the graph display to the user of user device 110. When populated with nodes, the graph display becomes an interaction graph.

In step 205, conversation module 120 identifies parties in the conversation. Based on speech recognition/call details, the various parties involved in the conversation are identified. Audio interface 112A works in conjunction with conversation module 120 to pick up voice data. Conversation module 120 utilizes analytics and algorithms to examine the voice data in order to identify the parties involved in the conversation.

In step 210, conversation module 120 creates entities in the interaction graph. The entities in the interaction graph are associated with a party of the conversation. These entities are depicted as entity nodes. Every phrase uttered by the parties in the conversation is stored as interaction nodes in the interaction graph. These interaction nodes get dynamically displayed in the interaction graph between the interacting entities. A voice channel (voice channel 315) separates the node associated with the user of user device 110 from the nodes associated with the user(s) of external devices 130A-N. See the discussion with respect to FIG. 3 for details on an interaction graph with entity nodes, interaction nodes, and a voice channel.

In step 215, conversation module 120 determines the associations between the parties of the conversation. Analytics are implemented on social network information associated with the parties of the conversation. Based on the performed analytics, conversation module 120 is able to determine if there are associations between the parties in the conversation. Some of the associations between the parties of the conversation may be characterized as: friends on a social network website, co-workers, and family members. The associations may be characterized in other ways.

In step 220, conversation module 120 receives user gestures. Based on user gestures processed by conversation module 120, the interaction graph displayed to a user is modified. Gestures associated with the "heat of the conversation" (i.e., the harshness and tone of the conversation); voice smileys (i.e., short phrases to cool or lessen the heat or harshness of the conversation, respectively); and the detection of topic diversions allows conversation module 120 to auto-generate newly created interaction nodes which can be drag-dropped into the voice channel entity in the interaction graph. Any interaction node (which is dragged into the voice channel) can get auto-rendered through the voice of the user and is received by the interaction nodes at the other end of the voice channel. When a conversation is starting to diverge into different directions, conversation module 120 identifies the diversion, notifies the user of user device 110 of the diversion, and creates interaction nodes to get back on topic. The user of user device 110 can drag-drop the auto created interaction node in the voice channel to send to the user(s) of external devices 130A-N to prevent topic diversions. See the discussion with respect to FIG. 4 for details on newly created nodes. "User gazes" such as a left-eye wink or a right-eye wink can be processed by conversation module 120. Gyroscopic sensors, which measure changes in orientation based on the principles of angular momentum, are able to pick up and analyze the user gazes.

If the user needs more information/background to talk more intelligently about a topic of discussion, a user gaze at the interaction node (about which the user needs more information) and specific eye gesture are implemented to obtain more details. This obtained information may also be created as interaction nodes which are dropped into the voice channel to render the obtained information to the other end of the voice channel. In one embodiment, a left-eye wink gesture is used to validate the information in the interaction node currently being gazed/pointed at while a right-eye wink gesture is used to provide more information about the interaction node currently being gazed/pointed at. See the discussion with respect to FIG. 5 for details on obtaining more information during a conversation.

Figure 4:
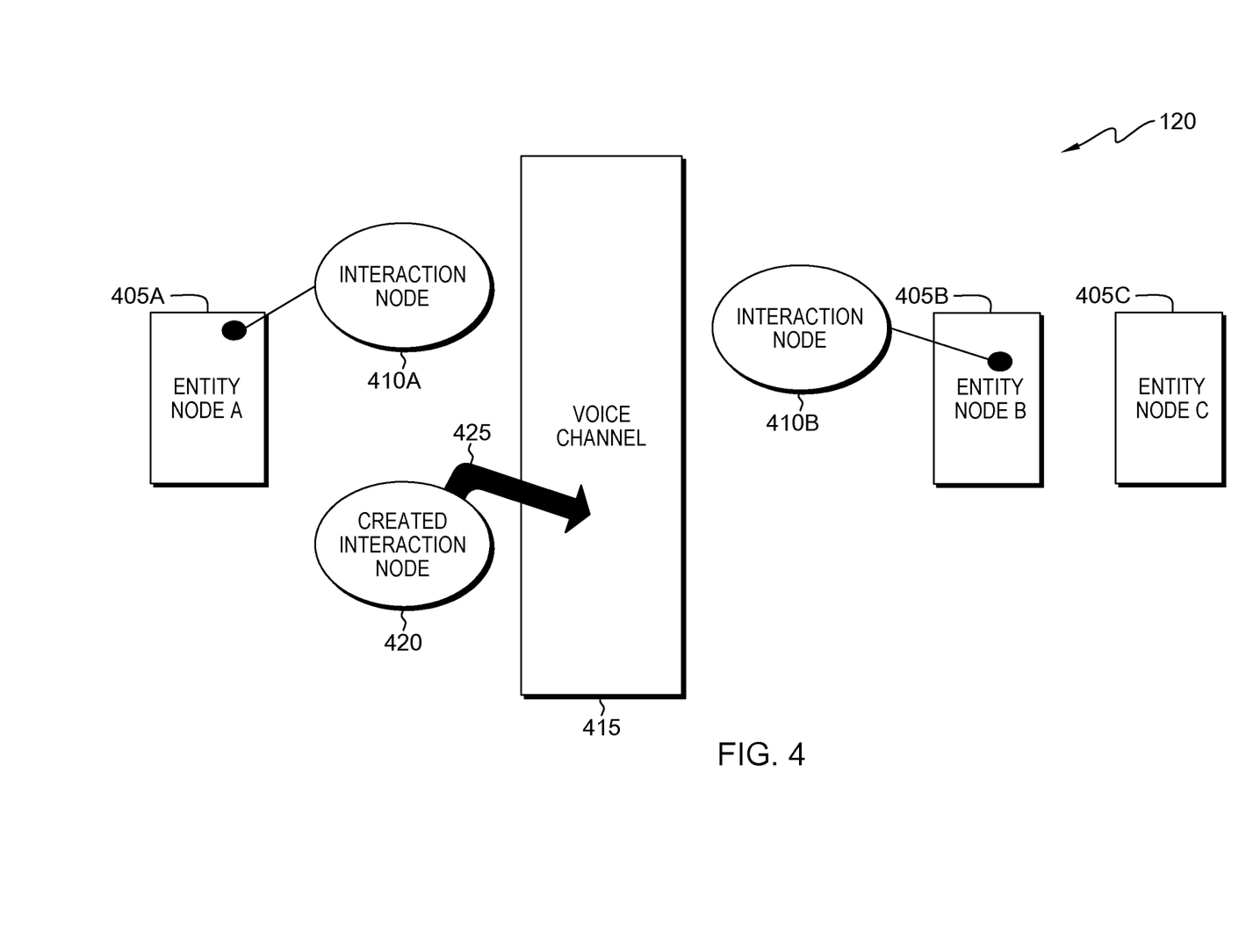
FIG. 4 is a functional block diagram of an interactive graph upon creating a new interaction node, in accordance with an embodiment of the present invention.

In step 225, conversation module 120 displays indicators based on prosodical extractions. Based on prosodical extractions from voices of the users of user device 110 and external devices 130A-N in a conversation, the dynamic heat of the conversation is displayed in color codes and auto-nodes are created to reduce the heat of the conversation. A phrase may be auto-voice rendered in order to ease tension between the parties of the conversation. Analytics on the conversation may find the conversation is getting "heated" (i.e., increasing tension). For example, the users of user device 110 and external devices 130A-N are about to get into a heated argument over finances during a conversation. In order to decrease the existing tension, conversation module 120 performs analytics on the conversation. The resulting prosodical extractions gains insights into the sentiments of the parties of the conversation. Auto-nodes which are generated to reduce the heat of the conversation are reminiscent of created interaction node 420 as depicted in FIG. 4. See the discussion with respect to FIG. 6 for details on prosodical extractions from voice interactions.

In step 230, conversation module 120 determines if there are common string queries. If a dynamic site is searched, then a portion of a dynamic URL contains the search parameters. Query strings do not exist until a user plugs the variables into a database search, at which point the search engine will create the dynamic URL with the query string based on the results. Query strings typically contain "?" and "%" characters. Common string queries do not need to be in any specific syntax and can also be in common language. Query strings are compared upon conversation module 120 determining a query or search string is received during a conversation.

In step 235, conversation module 120 creates new interaction nodes upon determining there are common string queries. When common string queries (e.g., phone numbers, addresses, and account numbers) are detected during the phone conversation, conversation module 120 automatically creates interaction nodes with the required common string suggestions. The user can choose the required string based on suggestions and send the string across the voice channel. For example, user A requests during a call to user B for an account number from user B. Subsequently, user B combs through user B's phone and conversation module 120 creates interaction nodes with the account number. User B can use conversation module 120 to send the information within the newly created interaction mode to User A by dropping the created interaction node into the graph display. See the discussion with respect to FIG. 4 for details on newly created nodes.

In step 240, conversation module 120 stores the interaction graph meta-data upon determining there are no common string queries. The interaction graph for each call is stored as metadata where each conversation may be analyzed and retrieved by a search and other mobile features at a later point in time. Based on topics contained within the interaction-graphs, a network of these interaction-graphs can be created in the mobile device. Whenever a user is involved in a conversation, various suggestions can be retrieved from past interaction graphs.

Figure 3:
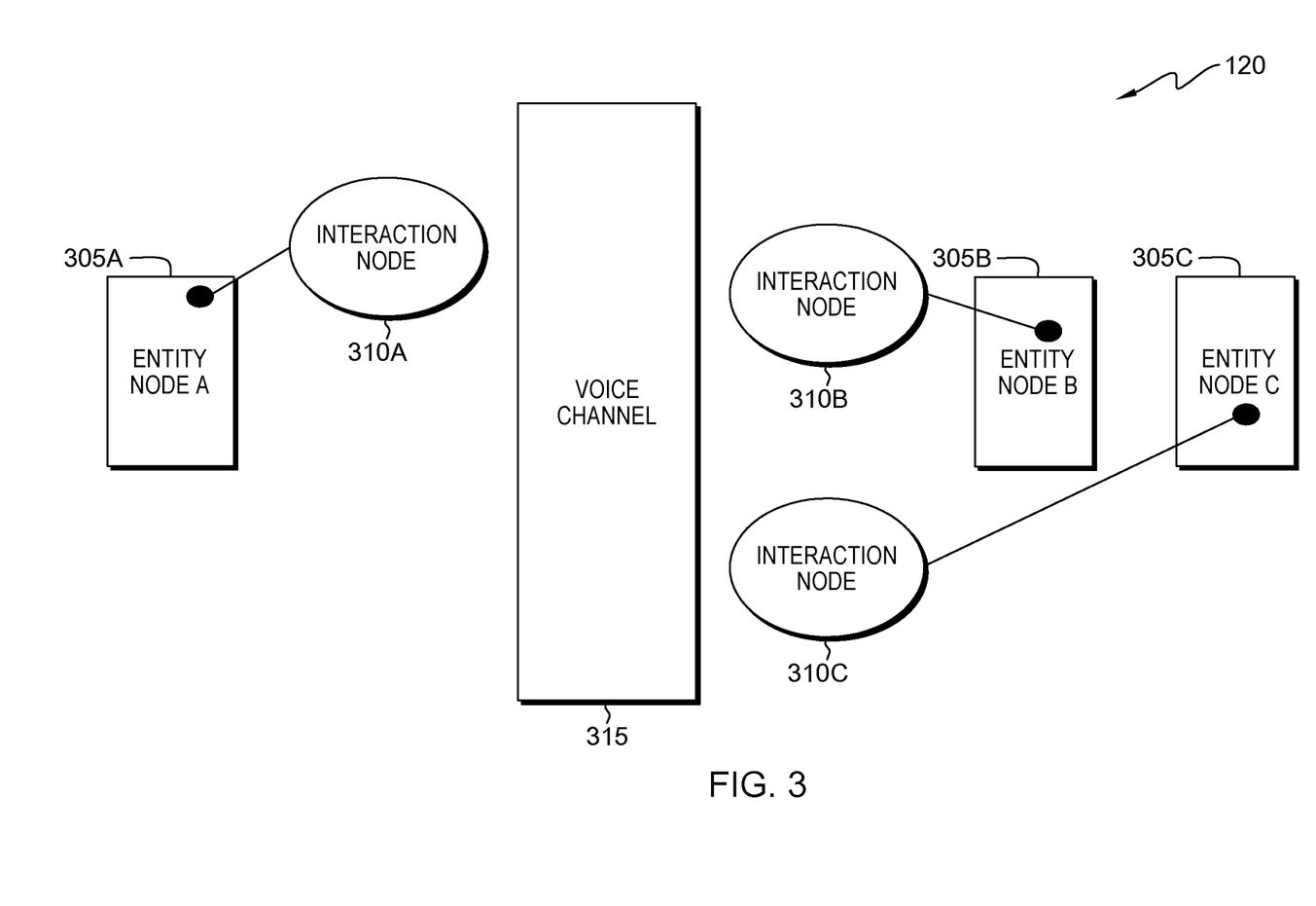
FIG. 3 is a block diagram depicting the elements of an interactive graph, in accordance with an embodiment of the present invention.

FIG. 3 is a block diagram depicting the elements of an interactive graph, in accordance with an embodiment of the present invention.

Based on speech recognition, different parties in the conversation are identified. Entity nodes for each party involved in the conversation are created in the display of an interactive graph. In this embodiment, the parties involved in the conversation in terms of nodes are entity nodes 305A, 305B, and 305C. Every phrase uttered by the parties in the conversation gets created as an interaction node in the graph. In this embodiment, the uttered phrases are generated as interaction nodes 310A, 310B, and 310C. Interaction nodes 310A, 310B, and 310C derive from entity nodes 305A, 305B, and 305C, respectively. Lower lying interaction nodes imply the time of the conversation took place later than the conversation of a higher lying interaction node. In this embodiment, the time of interaction node 310A is before interaction node 310B and the time of interaction node 310B is before interaction node 310C. The party utilizing user device 110 is associated with entity node 305A. The parties utilizing external devices 130A-N are associated with entity nodes 305B and 305C. Voice channel 315 depicts the boundary between the party utilizing user device 110 and the parties utilizing external devices 130A-N.

Voice channel 315 is a physical transmission medium such as a wire or a logical connection over a multiplexed medium which is used to convey an information signal from one or several senders (or transmitters) to one or several receivers. A channel has a certain capacity for transmitting information, often measured by its bandwidth in Hz or its data rate in bits per second. Communicating data from one location to another requires some form of pathway or medium. These pathways use two types of media: cable (twisted-pair wire, cable, and fiber-optic cable) and broadcast (microwave, satellite, radio, and infrared). Cable or wire line media use physical wires of cables to transmit data and information and to carry a human voice. In some embodiments, twisted-pair wire and coaxial cables are made of copper, and fiber-optic cable is made of glass. Nodes (whether they are entity nodes and interaction nodes) get dynamically displayed in the computer display.

FIG. 4 is a functional block diagram of an interactive graph upon creating a new interaction node, in accordance with an embodiment of the present invention.

Based on the social network information, associations between parties (or other users) within a conversation are determined. In this embodiment, the parties contained within the conversation are person A and person B. In the interactive graph, person A is associated with entity node 405A and person B is associated with entity node 405B where person B is the boss of person A (i.e., employee manager of person A). Interaction nodes 410A and 410B are conversations deriving from entity nodes 405A and 405B. Entity node 405A is separated from entity node 405B by voice channel 415. Conversation module 120 can form created interaction node 420 which can be moved across voice channel 415 via process 425. Process 425 is the movement of the contents within interaction node 420. Upon completing process 425, the content within created interaction node 420 is conveyed from entity node 405A to entity node 405B.

In an exemplary embodiment, entity node 405A (i.e., the party determined to be the employee of the boss) reports to entity node 405B (i.e., the party determined to be the boss of the employee). Analytics are performed on the conversation to determine if the content of interaction node 410A is a bit harsh in light of the content of interaction node 410B based on the sentiments in the voices of the parties. Conversation module 120 dynamically creates and suggests an interaction node (i.e., created interaction node 420) to bring back the coolness to the conversation (i.e., reduce the heat or tenseness of). Conversation module 120 dynamically creates and suggests an interaction node (i.e., created interaction node 420) to alleviate tensions in a conversation. If entity node 405A is satisfied with the content of created interaction node 450, conversation module 120 receives instructions from the end-user to perform process 425 in order to drag-drop created interaction node 420 to voice channel 415. Process 425 is the movement of the contents within interaction node 420. Created interaction node 420 crosses voice channel 415 and gets delivered to entity node 405B in the voice of entity node 405A and is displayed as an interaction node. An automated response systems can provide an automated response based on conversations and the sentiments required. These systems can be used as enablers to create interaction nodes.

In another embodiment, entity node 405A is in a conversation between entity node 405B. Conversation module 120 models topics within a conversation using probabilistic topic models. Probabilistic topic models apply statistical methods on databases or other types of data to yield insights into human cognition. When conversation module 120 detects topic diversions within a conversation, the divergent portion of the conversation is identified and the end user is notified of the divergent portion. Process 425 is the movement of the contents within interaction node 420. Created interaction node 420 is generated to get the conversation back on topic, which can be drag-dropped as process 425 into voice channel 415 in order to be sent to other parties of the conversation. In this embodiment, created interaction node 420 (which is sent to entity node 405B) is generated on the end physically closer to entity node 405A.

In yet another embodiment, entity node 405A is in a conversation between entity node 405B. Conversation module 120 processes queries involving common strings where a common string refers to user phone numbers, account number, address, etc. The content for these queries involving common strings are found within interaction nodes 410A and 410B. When such queries are made during the conversation, conversation module 120 generates created interaction node 420 with the required common string suggestions. Based on the multiple common string suggestions, conversation module 120 receives the choice of the common string suggestions from the end-user. The chosen common string suggestion is sent across voice channel 415 by drag dropping into the voice channel 415 via process 425. Process 425 is the movement of the contents within interaction node 420. For example, during a conversation between entity nodes 405A and 405B, entity node 405B wants to know the address of entity node 405A. Within created interaction node 420, multiple addresses of entity node 405A are generated by conversation module 120 as common string suggestions. Conversation module 120 receives the choice for the multiple generated addresses to be sent to entity node 405B.

Figure 5:
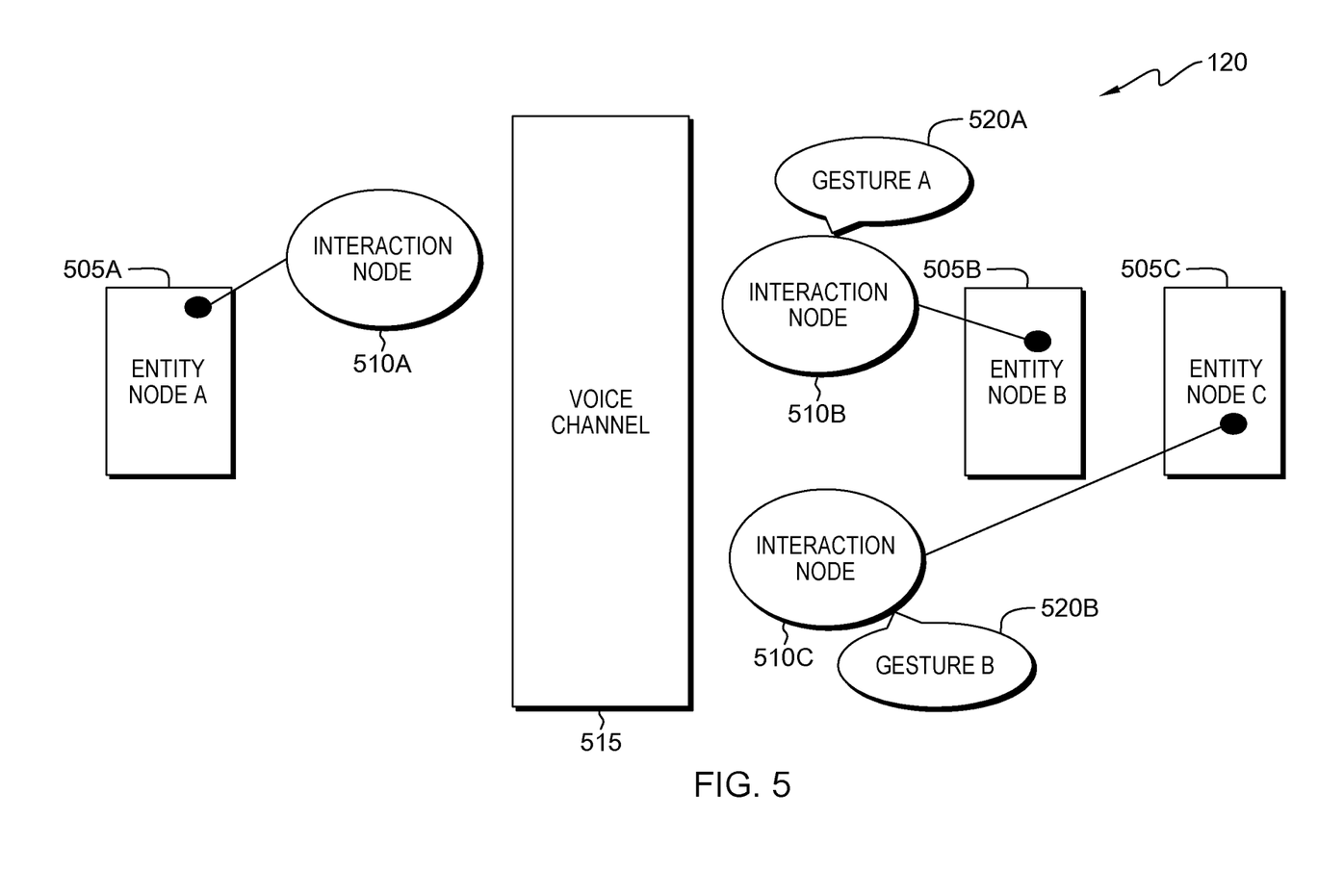
FIG. 5 is a block diagram depicting the elements of an interactive graph working in conjunction with a set of received gestures, in accordance with an embodiment of the present invention.

FIG. 5 is a block diagram depicting the elements of an interactive graph working in conjunction with a set of received gestures, in accordance with an embodiment of the present invention.

During the course of a conversation among two or more parties, one of the parties may require more information/background to talk intelligently about the topic. The parties involved in the conversations are associated with entity nodes 505A, 505B, and 505C. User gestures are received by conversation module 120 and further processed. In this embodiment, a user gazes at the interaction node (about which an end-user needs more information) and performs a specific eye gesture to get more details about a topic. Gestures 520A and 520B are left-eye winks and right-eye winks, respectively. Gesture 520A is the validation of the information in the interaction node 510B which is currently being gazed upon or pointed at. Gesture 520B causes a response which provides more information to interaction node 510C which is currently being gazed upon or pointed at.

Figure 6:
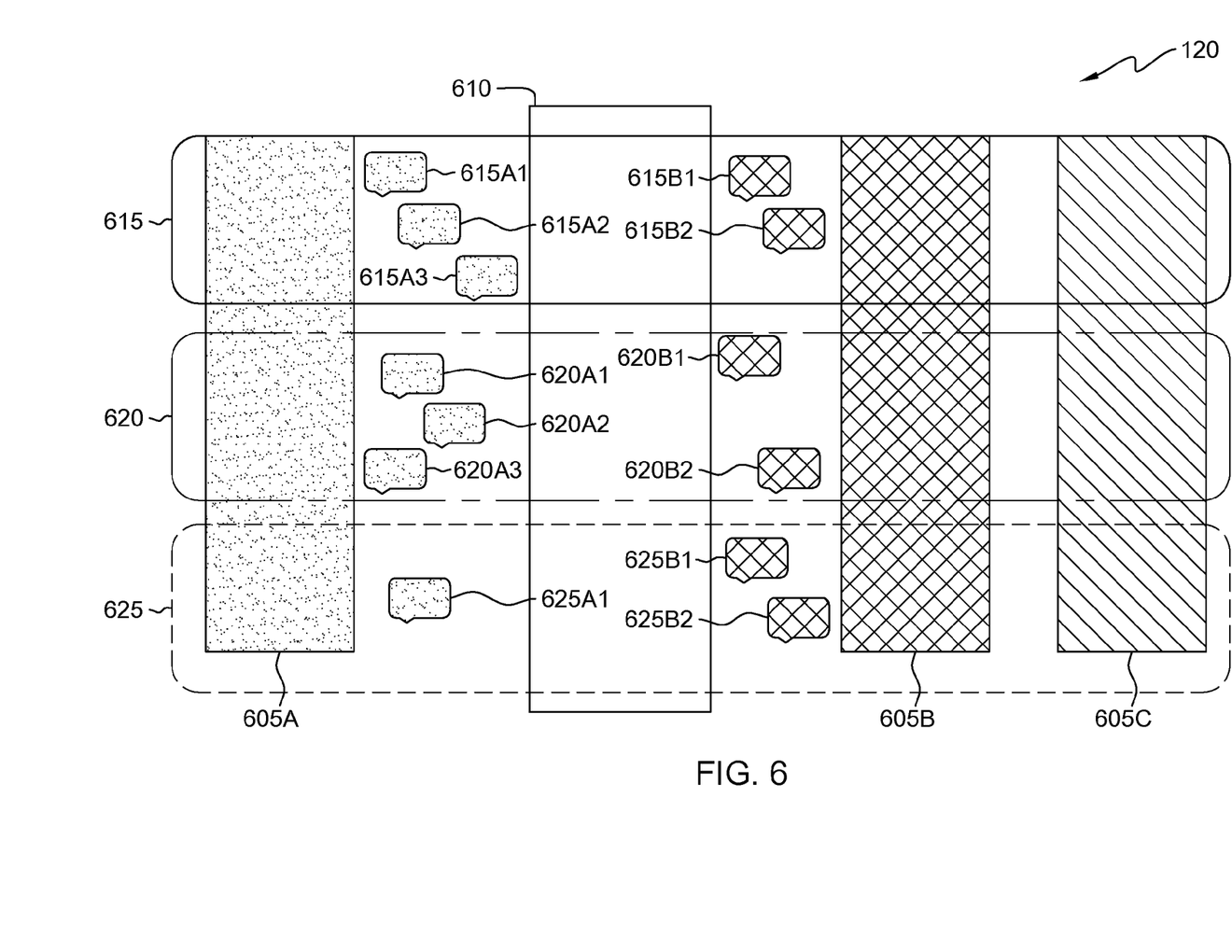
FIG. 6 is a block diagram depicting the elements of an interactive graph based on a prosodical extraction, in accordance with an embodiment of the present invention.

FIG. 6 is a block diagram depicting the elements of an interactive graph based on prosodical extraction, in accordance with an embodiment of the present invention.

Based on prosodical extractions from voices deriving from entity nodes, dynamic heat of the conversation gets displayed in color codes. In this embodiment, the interactive graph contains entity nodes 605A, 605B, and 605C; voice channel 610; portions 615, 620, and 625; and the associated conversations (interaction nodes 615A1, 615A2, 615A3, 620A1, 620A2, 620A3, 625A1, 615B1, 615B2, 620B1, 620B2, 625B1, and 625B2).

In this exemplary embodiment, entity node 605A is in a conversation with entity node 605B. Interaction nodes 615A1, 615A2, 615A3, 620A1, 620A2, 620A3, and 625A1 are the associated conversations with entity node 605A. Interaction nodes 615B1, 615B2, 620B1, 620B2, 625B1, and 625B2 are the associated conversations with entity node 605B. The lower lying interaction nodes take place at a later time than the higher lying interaction nodes.

In this embodiment, portions 615, 620, and 625 are indicative of the "heat of the conversation." These portions are color coded to depict the intensity of the heat of the conversation between entity nodes 605A and 605B. Conversations within portion 615 has the greatest relative level of heat, conversations within portion 620 has intermediate relative level of heat, and conversations within portion 625 has the least relative level of heat. Interaction nodes 615A1, 615A2, and 615A3 (which are conversations associated with entity node 605A) and interaction nodes 615B1 and 615B2 (which are conversations associated with entity node 605B) have the greatest relative level of heat as indicated by its location in portion 615. Interaction nodes 620A1, 620A2, and 620A3 (which are conversations associated with entity node 605A) and interaction nodes 620B1 and 620B2 (which are conversations associated with entity node 605B) have the intermediate relative level of heat as indicated by its location in portion 620. Interaction nodes 625A1 (which is a conversation associated with entity node 605A) and interaction nodes 625B1 and 625B2 (which are conversations associated with entity node 605B) have the lowest relative level of heat as indicated by its location in portion 625. Conversation module 120 creates new interaction nodes to reduce the heat of the conversation (see FIG. 4).

Figure 7:
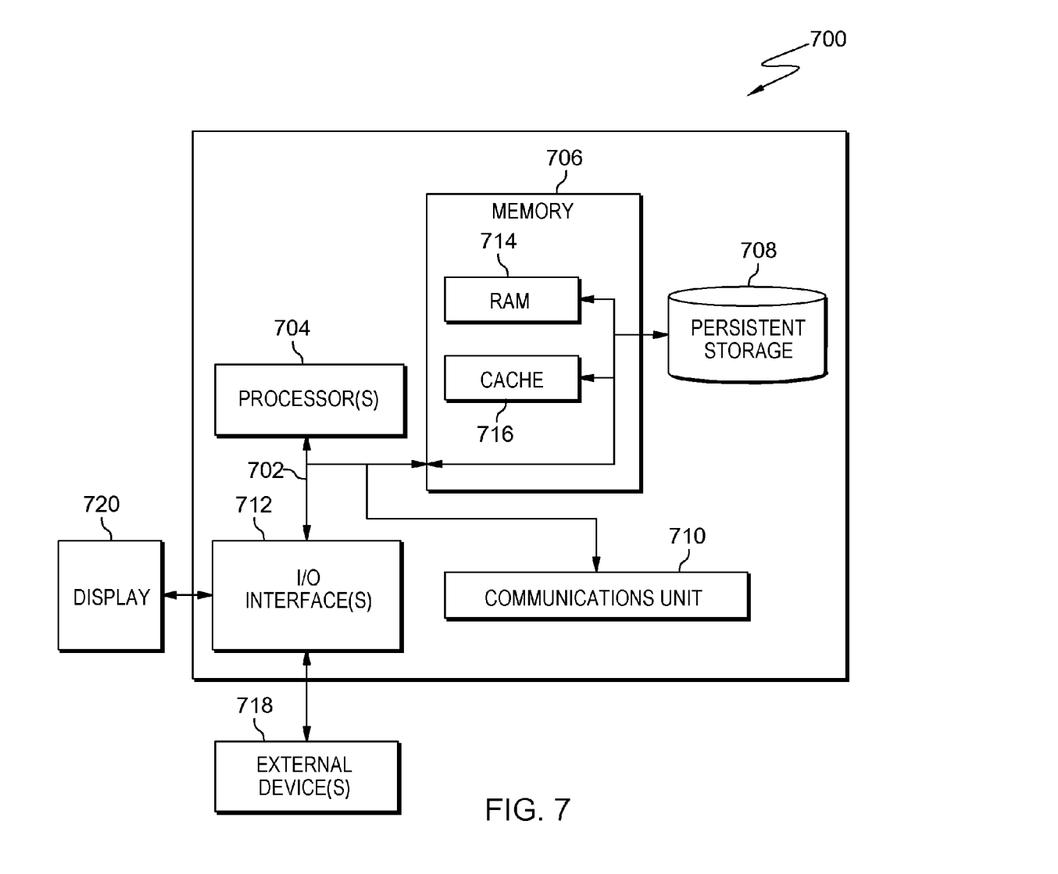
FIG. 7 depicts a block diagram of internal and external components of a computing device, in accordance with an embodiment of the present invention.

FIG. 7 depicts a block diagram of internal and external components of computing device 700, such as the mobile devices of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

Program instructions and data used to practice embodiments of the present invention may be stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices, including resources of network 125. In these examples, communications unit 710 includes one or more network interface cards. Communications unit 710 may provide communications through the use of either or both physical and wireless communications links. Program instructions and data used to practice embodiments of the present invention may be downloaded to persistent storage 708 through communications unit 710.

I/O interface(s) 712 allows for input and output of data with other devices that may be connected to computing device 700. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for analyzing mobile device usage, the method comprising:
   creating, by one or more processors, a graph display which is depicting a conversation between at least two parties, wherein the graph display contains:
      a first set of nodes which represent the at least two or more parties of the conversation, wherein:
      a node, among the first set of nodes, is associated with a first party of the at least two or more parties of the conversation, and
      another node, among the first set of nodes, is associated with a second party of the at least two or more parties of the conversation, and a second set of nodes which represent contents of the conversation, wherein:
      one or more nodes, among the second set of nodes, are associated with a first party of the at least two or more parties of the conversation, and
      one or more nodes, among the second set of nodes, are associated with a second party of the at least two or more parties of the conversation; receiving, by one or more processors, voice data from the first party and the second party of the at least two parties and encoding the voice data into the second set of nodes of the graph display associated with the first party and the second party, wherein the first party and the second party are represented by the first set of nodes;
   sending, by the first party the one or more nodes, among the second set of nodes, associated with the first party, to the second party over a virtualized boundary in the graph display, wherein the virtualized boundary separates the first party from the second party;
   receiving, by the second party, content associated with the sent one or more nodes, among the second set of nodes, over the virtual boundary in the graph display;
   determining, by one or more processors, whether a plurality of event types have occurred during the conversation by performing analytics on the encoded voice data in the second set of nodes, and wherein the plurality of event types consist of:
      a first type of event, wherein the first type of event are one or more instances of negative emotional sentiments expressed between the first party and the second party,
      a second type of event, wherein the second type of event are one or more search queries, wherein the one or more search queries are received by the second party from the first party or the first party from the second party, and
      a third type of event, wherein the third type of event are one or more divergences from a first topic in the conversation to a second topic in the conversation;
   in response to determining that the plurality of event types has occurred, generating, by one or more processors, a third set of nodes associated with the plurality of event types, wherein the third set of nodes are transposable across the virtualized boundary;
   incorporating, by one or more processors, the third set of nodes into the graph display, wherein the third set of nodes consist of:
      generated text which reduces negative emotional sentiments expressed between the first party and second party responsive to determining the first type of event has occurred,
      generated text which answers the one or more search queries responsive to determining the second type of event has occurred, and
      generated text which brings back the conversation back to the first topic from the second topic responsive to determining the third type of event has occurred; and
   generating, by one or more processors, an automated response system in a call center based on the third set of nodes, wherein the automated response system addresses the negative emotional sentiments and the divergences in the conversations between the at least two parties.

2. The method of claim 1, further comprising:
   responsive to receiving one or more external user gestures, generating, by one or more processors, a gesture node to be incorporated into the third set of nodes, wherein the gesture node is transported across the virtualized boundary separating the first party from the second party, and wherein the gesture node contains preconfigured instructions to perform an action.

3. The method of claim 1, wherein creating the graph display which is depicting the conversation between the at least two parties, comprises:
   generating, by one or more processors, a color-coded graph display wherein the color-coded graph display contains the first set of nodes associated with the at least two parties of the conversation, the second set of nodes associated with content of the conversation from the first set of nodes, the third set of nodes, and the virtualized boundary separating the first party from the second party;
   responsive to correlating the content in the first set of nodes, the second set of nodes, and the third set of nodes with a level of emotional sentiment, grouping, by one or more processors, the first set of nodes; the second set of nodes; and the third set of nodes into a color-coded portion corresponding to the level of emotional sentiment, wherein the level of emotional sentiment is at least one of high emotional sentiment, intermediate emotional sentiment and low emotional sentiment; and displaying, by one or more processors, one or more color-coded portions in the color-coded graph display, wherein each color-coded portion corresponds to the relative level of emotional sentiment.

4. A computer program product for analyzing mobile device usage, the computer program product comprising:

a computer readable storage medium and program instructions stored on the computer readable storage medium, the program instructions comprising:

program instructions to create a graph display, which is depicting a conversation between at least two parties, wherein the graph display contains:

a first set of nodes which represent the at least two or more parties of the conversation, wherein:

a node, among the first set of nodes, is associated with a first party of the at least two or more parties of the conversation, and another node, among the first set of nodes, is associated with a second party of the at least two or more parties of the conversation, and a second set of nodes which represent contents of the conversation, wherein:

one or more nodes, among the second set of nodes, are associated with a first party of the at least two or more parties of the conversation, and one or more nodes, among the second set of nodes, are associated with a second party of the at least two or more parties of the conversation; program instructions to receive voice data from the first party and the second party of the at least two parties and encoding the voice data into the second set of nodes of the graph display associated with the first party and the second party, wherein the first party and the second party are represented by the first set of nodes;

program instructions to send the one or more nodes, among the second set of nodes, associated with the first party, to the second party over a virtualized boundary in the graph display, wherein the virtualized boundary separates the first party from the second party;

program instructions to receive content associated with the sent one or more nodes, among the second set of nodes, over the virtual boundary in the graph display;

program instruction to determine whether a plurality of event types have occurred during the conversation by performing analytics on the encoded voice data in the second set of nodes, and wherein the plurality of event types consist of:

a first type of event, wherein the first type of event are one or more instances of negative emotional sentiments expressed between the first party and the second party, a second type of event, wherein the second type of event are one or more search queries, wherein the one or more search queries are received by the second party from the first party or the first party from the second party, and a third type of event, wherein the third type of event are one or more divergences from a first topic in the conversation to a second topic in the conversation;

in response to determining that the plurality of event types has occurred, generating, by one or more processors, a third set of nodes associated with the plurality of event types, wherein the third set of nodes are transposable across the virtualized boundary;

program instructions to incorporate the third set of nodes into the graph display, wherein the third set of nodes consists of:

generated text which reduces negative emotional sentiments expressed between the first party and second party responsive to determining the first type of event has occurred, generated text which answers the one or more search queries responsive to determining the second type of event has occurred, and generated text which brings back the conversation back to the first topic from the second topic responsive to determining the third type of event has occurred; and program instructions to generate an automated response system in a call center based on the third set of nodes, wherein the automated response system addresses the negative emotional sentiments and the divergences in the conversations between the at least two parties.

5. The computer program product of claim 4, further comprising:

responsive to receiving one or more external user gestures, program instructions to generate a gesture node to be incorporated into the third set of nodes, wherein the gesture node is transported across the virtualized boundary separating the first party from the second party, and wherein the gesture node contains preconfigured instructions to perform an action.

6. The computer program product of claim 4, wherein program instructions to create the graph display which is depicting the conversation between the at least two parties, comprise:

program instructions to generate a color-coded graph display wherein the color-coded graph display contains the first set of nodes associated with the at least two parties of the conversation, the second set of nodes associated with content of the conversation from the first set of nodes, the third set of nodes, and the virtualized boundary separating the first party from the second party;

responsive to correlating the content in the first set of nodes, the second set of nodes, and the third set of nodes with a level of emotional sentiment, program instructions to group the first set of nodes; the second set of nodes; and the third set of nodes into a color-coded portion corresponding to the level of emotional sentiment wherein the level of emotional sentiment is at least one of high emotional sentiment, intermediate emotional sentiment and low emotional sentiment; and program instructions to display one or more color-coded portions in the color-coded graph display, wherein each color-coded portion corresponds to the relative level of emotional sentiment.

7. A computer system for analyzing mobile device usage, the computer system comprising:

one or more computer processors;

one or more computer readable storage media; and program instructions stored on the one or more computer readable storage media for execution by at least one of the one or more processors, the program instructions comprising:

program instructions to create a graph display which is depicting a conversation between at least two parties, wherein the graph display contains:
a first set of nodes which represent the at least two or more parties of the conversation, wherein:
  a node, among the first set of nodes, is associated with a first party of the at least two or more parties of the conversation, and
  another node, among the first set of nodes, is associated with a second party of the at least two or more parties of the conversation, and a second set of nodes which represent contents of the conversation, wherein:
  one or more nodes, among the second set of nodes, are associated with a first party of the at least two or more parties of the conversation, and
  one or more nodes, among the second set of nodes, are associated with a second party of the at least two or more parties of the conversation;
program instructions to receive voice data from the first party and the second party of the at least two parties and encoding the voice data into the second set of nodes of the graph display associated with the first party and the second party, wherein the first party and the second party are represented by the first set of nodes;
program instructions to send the one or more nodes, among the second set of nodes, associated with the first party, to the second party over a virtualized boundary in the graph display, wherein the virtualized boundary separates the first party from the second party;
program instructions to receive content associated with the sent one or more nodes, among the second set of nodes, over the virtual boundary in the graph display;
program instruction to determine whether a plurality of event types have occurred during the conversation by performing analytics on the encoded voice data in the second set of nodes, and wherein the plurality of event types consist of:
  a first type of event, wherein the first type of event are one or more instances of negative emotional sentiments expressed between the first party and the second party,
  a second type of event, wherein the second type of event are one or more search queries, wherein the one or more search queries are received by the second party from the first party or the first party from the second party, and
  a third type of event, wherein the third type of event are one or more divergences from a first topic in the conversation to a second topic in the conversation;
in response to determining that the plurality of event types has occurred, generating, by one or more processors, a third set of nodes associated with a respective event type, wherein the third set of nodes are transposable across the virtualized boundary;
program instructions to incorporate the third set of nodes into the graph display, wherein of the third set of nodes consists of:
  generated text which reduces negative emotional sentiments expressed between the first party and second party responsive to determining the first type of event has occurred,
  generated text which answers the search queries responsive to determining the second type of event has occurred, and
  generated text which brings back the conversation back to the first topic from the second topic responsive to determining the third type of event has occurred; and
program instructions to generate an automated response system in a call center based on the third set of nodes, wherein the automated response system addresses the negative emotional sentiments and the divergences in the conversations between the at least two parties.

8. The computer system of claim 7, further comprising:
responsive to receiving one or more external user gestures, program instructions to generate a gesture node to be incorporated into the third set of nodes, wherein the gesture node is transported across a virtualized boundary separating a first party from a second party, and wherein the gesture node contains preconfigured instructions to perform an action.

9. The computer system of claim 7, wherein program instructions to create the graph display which is depicting the conversation between the at least two parties, comprise:
program instructions to generate a color-coded graph display wherein the color-coded graph display contains the first set of nodes associated with the at least two parties of the conversation, the second set of nodes associated with content of the conversation from the first set of nodes, the third set of nodes, and the virtualized boundary separating the first party from the second party;
responsive to correlating the content in the first set of nodes, the second set of nodes, and the third set of nodes with a level of emotional sentiment, program instructions to group the first set of nodes; the second set of nodes; and the third set of nodes into a color-coded portion corresponding to the level of emotional sentiment wherein the level of emotional sentiment is at least one of high emotional sentiment, intermediate emotional sentiment and low emotional sentiment; and
program instructions to display one or more color-coded portions in the color-coded graph display, wherein each color-coded portion corresponds to the relative level of emotional sentiment.

* * * * *